United States Patent [19]

Bliven, II et al.

[11] 4,243,938
[45] Jan. 6, 1981

[54] DIGITAL BAR GRAPH TACHOMETER

[75] Inventors: Andrew W. Bliven, II; Peter J. Kindlmann, both of Northford, Conn.

[73] Assignee: The Echlin Manufacturing Company, Branford, Conn.

[21] Appl. No.: 951,465

[22] Filed: Oct. 16, 1978

[51] Int. Cl.³ .............................................. G01P 3/48
[52] U.S. Cl. ...................... 324/169; 324/161
[58] Field of Search ............... 324/161, 166, 169, 170, 324/172–175, 96, 99 D, 78 D, 122, 133, 79 D

[56] References Cited

U.S. PATENT DOCUMENTS

| | | | |
|---|---|---|---|
| 3,818,495 | 6/1974 | Sagara | 324/96 |
| 3,825,827 | 7/1974 | Tumbush | 324/96 |
| 3,866,120 | 2/1975 | Ford | 324/96 |
| 3,987,392 | 10/1976 | Kugelmann | 324/96 |

Primary Examiner—Michael J. Tokar
Attorney, Agent, or Firm—Kenyon & Kenyon

[57] ABSTRACT

In order to provide a tachometer which is accurate and easy to read, a number of light-emitting diodes is arranged in a row, each diode representing a predetermined increment of speed, rotational speed is measured and used to generate pulses, at a proportional rate, which are then decoded and used to drive the light emitting diodes over a predetermined time span, the diodes being lighted repeatedly in sequence at a rate exceeding the response time of the eye so as to present a flicker-free bar graph type display showing rotational speed.

34 Claims, 6 Drawing Figures

DIGITAL BAR GRAPH TACHOMETER

BACKGROUND OF THE INVENTION

This invention relates to tachometers in general and more particularly to a digital tachometer utilizing a row of light emitting diodes to provide a display which appears in the form of a bar graph.

Tachometers are required for many purposes where rotational speed is to be measured. Various types of tachometers are known, working both on mechanical and electrical principles. For example, a simple electric tachometer can be formed by driving an electrical generator which then develops a voltage proportional to speed which can then be displayed on a meter. Similarly, mechanical tachometers are known in which a cable is connected to a rotating part and an indication of speed transmitted mechanically to a display.

One place where tachometers find application is in automobiles where it is desired to measure the engine rpm. Tachometers are also used in other vehicles having internal combustion or turbine engines such as in aircraft. It has been typical in tachometers used with internal combustion engines having an ignition system, i.e., gasoline engines, to utilize the firing pulses to the engine to generate a tachometer signal. Thus, for example, circuits have been developed in which pulses from the distributor are sensed, possibly shaped, rectified, and the rectified voltage used to drive the meter. In such a circuit, because of the rectifier, an average DC voltage corresponding to rpm is developed. Other circuits have also been developed which, in other ways, average the output pulses of a distributor in order to obtain an analog DC voltage capable of driving a meter movement. It will be recognized, that tachometers of this nature have a limited accuracy which is directly related to the components involved and possible aging or change in value of the resistors, capacitors, etc., used in the device.

In an attempt to overcome this problem there have been attempts to develop digital tachometers. However, in each case, the digital display was by means of segmented digital displays driven by a decoded binary count. One of the major disadvantages of such a device is the poor readability of the display due to rapidly changing numbers. Other problems have been found in sensitivity to interference and cost. In one system which was tested and found to be unsatisfactory, a phase locked loop was employed to phase lock the divided output of a voltage controlled oscillator driving a counter to the incoming pulses from the distributor. The counter output was then latched at a predetermined time and the latch outputs used to drive a display.

It is thus evident that there is a need for an improved tachometer, useful particularly in automotive applications, which does not suffer from the deficiencies of prior art tachometers.

SUMMARY OF THE INVENTION

It is thus the object of the present invention to provide a reliable, accurate and cost effective digital tachometer which is easy to read. The present invention provides such a digital tachometer. Essentially the digital tachometer includes a row of a plurality of closely adjacent light emitting diodes, each representing, in order, an increment of speed. This allows presenting a bar graph type display to the observer. The tachometer also includes means to sense the rotational speed of rotating apparatus and develop a first signal representative of this speed. It also includes means to convert this first signal into a plurality of signals of a maximum number equal to the number of the plurality of diodes provided, each associated with a diode, and, thus, with a speed increment such that a signal is present for each diode representing a speed equal to or less than the sensed rotational speed. What this means is that diodes representing increments less than the sensed speed along with that indicating the sensed speed will be lighted to give the bar graph type display. Finally, there are means coupling the signal so developed to the light emitting diodes.

In accordance with a further feature of the present invention, means are provided to cause the next adjacent diode to blink when the speed is more than half the predetermined increment above the last diode lighted. For example, if the diodes represent 250 rpm increments and the speed is 750 rpm, 3 diodes will be lighted. When the speed reaches 875 rpm, i.e., halfway between 750 and 1,000, the next diode, the diode representing 1,000 rpm will be flashed. In this way, by flashing, a resolution of the speed into a number of increments that is twice the number of diodes employed is possible.

The specific embodiment of the present invention is directed to a gasoline internal combustion engine which includes an ignition system. However, the tachometer can be used with any rotating apparatus. In the automotive application, pulses are readily available from the distributor. However, in other applications where such pulses are not available, appropriate pulse generating means, such as shaft encoders can be provided.

The present invention also discloses a specific manner of implementing the means which drive the display. In a specifically illustrated embodiment, distributor pulses are coupled through a pulse shaper into a phase locked loop which includes a phase comparator, filter and voltage controlled oscillator. The output of the voltage controlled oscillator is an input to a binary counter, the last stage of which provides an output which is compared in the phase comparator with the incoming distributor pulses after shaping. In effect, this results in a multiplication of the distributor pulse train. The outputs of the binary counter are decoded and provided to the array of light emitting diodes. Means are provided to enable the array of diodes for a fixed period of time depending on the type of engine used and the maximum rpm capability of the tachometer. The time required for the count to reach a value equal to the maximum range of the tachometer when operating at the corresponding speed, e.g., the time required for the counter to reach a count corresponding to 8,000 rpm when the engine is operating at 8,000 rpm, with 8,000 rpm the range of the instrument, is used as the time of enablement. Since, when operating at a lower speed, fewer counts will be generated in the time period an accurate representation occurs for all speeds. With the example given of a range of 0 to 8,000 rpm, if the actual speed is 4,000 rpm, the pulse rate will be cut in half. Thus, in the time allotted only half as many pulses will reach the binary counter and its output will be one half the maximum, or will represent 4,000 rpm. The counter has a number of stages determined by the maximum range of the instrument and by the increment.

In the illustrated embodiment where flashing of the next light emitting diode is carried out, an extra stage of the counter is used for that purpose. Thus, with the same example given above, where increments are 250 rpm and the maximum rpm is 8,000, 32 light emitting diodes are required. This in itself would only require 6 stages in the counter. However, in order to divide the 250 rpm increment in half an additional stage representing 125 rpm is required. In the illustrated circuit, at the end of the time period of enablement, this first bit of the counter representing 125 rpm is checked and if present, the next light is flashed, and if not present, the next light not flashed.

Enablement of the light emitting diodes of the array is accomplished in an efficient manner by arranging the diodes in a matrix, one side of which is driven by the output of a decoder representing outputs in 250 rpm increments up to 1750 rpm and the other sides driven by a decoder representing 2,000 rpm increments.

In the illustrated embodiment, the light emitting diodes are lighted in sequence up to the diode representing the maximum speed. This is done repeatedly for each rotation of the engine. The 250 rpm light emitting diode is maintained on at all times. Thus, at the lowest maximum sensed speed of 500 rpm, the light emitting diode (LED) representing this speed will be lighted 500 times a minute. Of course, with increasing speed, the number of times per minute that each LED, which responds, is lighted, increases. As viewed by the observer, the LED is always on. The fractional on time of each lighted LED is constant and so, therefore, is the perceived brightness. The response time of the eye is not fast enough to see the flashing. In order to flash, or blink a next LED where such is required, a 7 Hz signal is superimposed on the signal provided to light the LED. What this means is, for example, at a speed of 1,375 rpm, at which point signals appear approximately 25 times a second, a rate not detectable by the eye, due to the 7 Hz signal superimposed only approximately ⅓ of the signals will get through so that the LED which it is desired to flash will appear to flash.

Although, the implementation just described is considered to be the most efficient, and an implementation which gives good reliability, low cost and high accuracy, a tachometer of the general nature disclosed and claimed herein could be driven in other manners. For example, in certain types of apparatus it might be possible to develop a voltage signal from a tachometer generator and use it directly to drive a voltage controlled oscillator, the output of which in turn drives a binary counter whose output is decoded. And, for that matter, the decoding does not have to be done in the disclosed manner. It would be possible, for example to decode without the use of a matrix, using a decoder with 32 separate outputs. Furthermore, these outputs could be latched and stored so as to provide a signal to keep the LEDs on constantly between samples. All of these variations fall within the broad aspects of the present invention.

Another aspect of the present invention is in its ability to present a bar graph type display not only of a speed but of any value which can be represented by a pulse train of varying frequency. In the previously discussed aspects of the invention, a pulse train which is proportional to rpm is developed. This pulse train is counted for a fixed time equal to the time between input pulses at a maximum rpm. The generation of an enabling pulse equal to that time simply represents a scaling operation. It is, for example, possible to convert any voltage to a frequency using a voltage controlled oscillator. If one simply establishes the time to fill the counter, or to reach the last stage of the counter at a maximum frequency corresponding to some maximum value, the time of enablement is established. The apparatus of the present invention, for example, could be adapted to simply measuring frequency. As an example, if one wanted to accurately measure line frequency, the 60 Hz line frequency could be provided as an input to the pulse shaper of the present invention, and the time of enabling selected to be equal to twice that of the AC period. This would mean that, at the proper frequency, the bar graph would be lighted halfway. Any deviations up or down from this frequency, would cause the bar graph to move off this point. By using a large enough counter, as much resolution as desired could be obtained. Note, that it would not be necessary in such an application to use all of the counter outputs since the frequency would not vary much from the 60 Hz.

It should also be noted that use of the phase locked loop to multiply frequency is not required where the frequency of the signal being measured is high enough to give a flicker-free display.

BRIEF DESCRIPTION OF THE DRAWINGS

FIG. 2 is a plan view of the face of the tachometer.

DETAILED DESCRIPTION OF THE INVENTION

Figure 1:
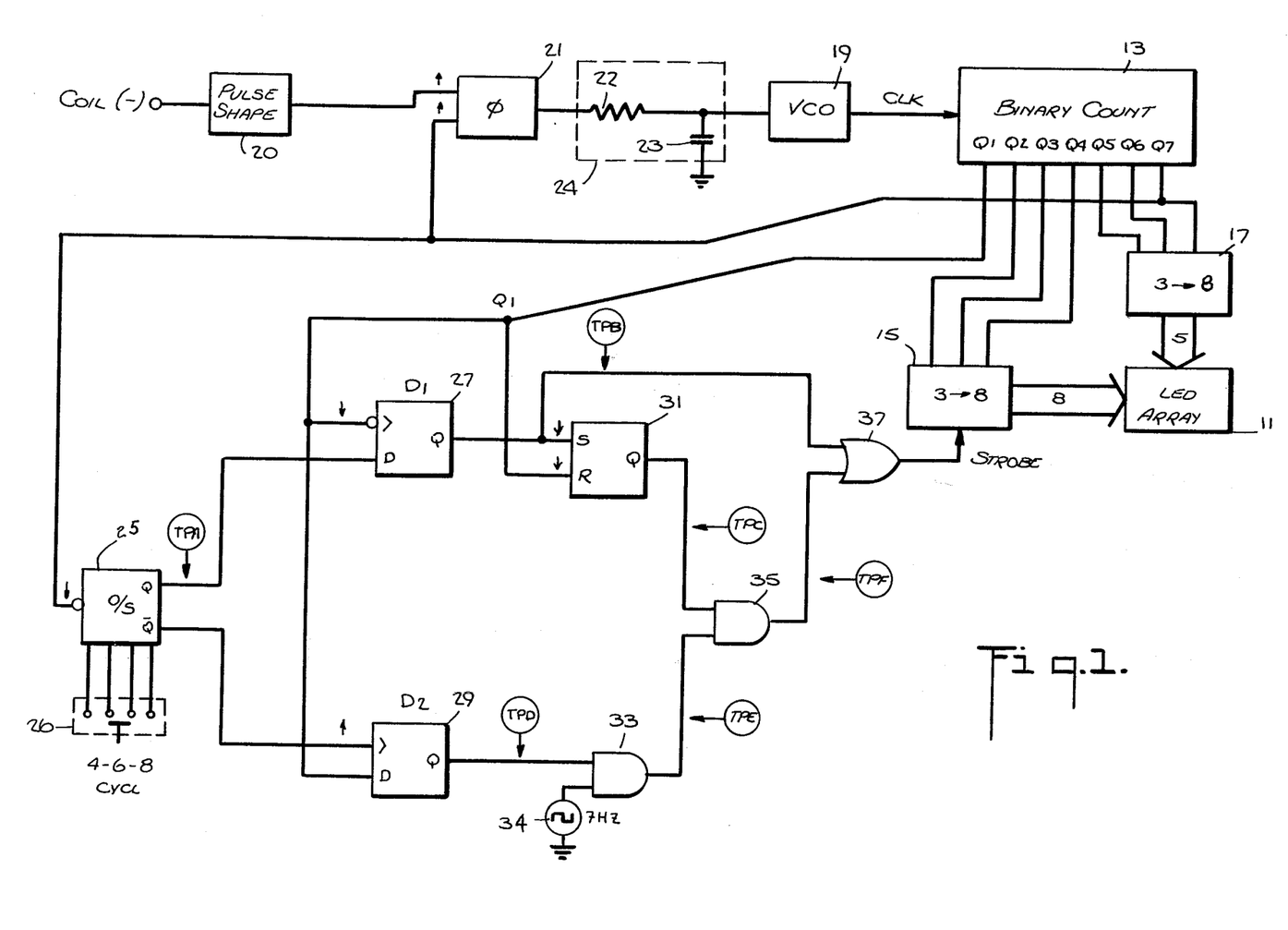
FIG. 1 is a block diagram of the tachometer of the present invention.

FIG. 1 is a block diagram of the LED tachometer logic circuitry of the present invention. The final circuit output which is the display which the driver views is an LED array 11 comprising 32 light emitting diodes representing 250 rpm intervals, from 250 rpm to 8000 rpm (see FIG. 2). The LEDs are in a matrix controlled by the outputs of a binary counter 13 coupled through two 3 to 8 decoders 15 and 17. The operation of the matrix will be described in more detail below.

The binary counter 13 receives an input from a voltage controlled oscillator (VCO) 19. VCO 19 is fed from a phase comparator 21 through a filter comprising a resistor 22 in series and a capacitor 23 to ground at the input of the VCO 19. In the phase comparator 21, the phase of the seventh and last stage output of the binary counter is compared with the phase of a pulse from a pulse shaper 20 which obtains its input from the negative primary coil lead in the automobile with which the tachometer is used. The pulse shaper 20 includes a low pass filter and a Schmitt trigger making it compatible with most present day ignition systems. The seventh output of the binary counter 13 is also fed to a one shot multivibrator 25 whose input is sensitive to the falling edge of the pulse from the counter 13. The $\overline{Q}$ output of the one shot multivibrator is the data input to a first D type flip-flop 27. The Q output of the one shot multivibrator 25 is the clocking input to a second D type flip-flop 29. The first output of the binary counter 13 is the clock input to the flip-flop 27, and the data input to the flip-flop 29. Flip-flop 27 is adapted to trigger on a falling clock pulse edge and flip-flop 29 on a rising pulse edge.

The one shot multivibrator 25 has an external connection to a switch 26 to permit the selection of its pulse length in conventional fashion through use of different RC circuits to permit use of the circuit of the present invention with a 4, 6 or 8 cylinder engine.

The Q output of the flip-flop 27 is coupled to the set input of a set reset flip-flop 31, which receives its reset from the first or Q1 output of the binary counter 31. The Q output of the flip-flop 29 is one input to an AND gate 33 which receives its second input from a 7 Hz square wave generator 34. The output of gate 33 and the Q output of flip-flop 31 are ANDed in an AND gate 35. The output of AND gate 35 is ORed in an OR gate 37 with the Q output of flip-flop 27. The output of gate 37 is a strobe input to the decoder 15.

In operation, each time a cylinder is fired an output is received from the coil into pulse shaper 20. This converts the coil pulse into a square pulse, with a rising edge synchronized to spark ignition. This pulse has its rising edge compared with the rising edge of the pulse output from the binary counter 13 in phase comparator 21. The output of the phase comparator 21 is filtered and provides the input to VCO 19. In effect, the capacitor 23 in the filter acts to store an average value proportional to the frequency of pulses from the coil, and any error between the two pulses is compared in the phase comparator and increases or decreases its voltage and thus the frequency output of the VCO 19 until the VCO is operating at a frequency which is a multiple of the frequency at the coil. Since the frequency at the coil is proportional to the rpm of the engine, the frequency out of VCO 19 will then also be proportional to the rpm. The frequency at VCO 19, however, is divided by 128 in the counter 13. Thus, VCO 19 frequency will be 128 times that of the coil. It will be recognized by those skilled in the art that phase comparator 21, filter 24 and voltage controlled oscillator 19 together form a phase locked loop with the input to the phase locked loop being the input from the pulse shaper 20 and the feedback signal being the Q7 output of the counter 13.

Table I below sets out the values assigned to each of the bits in the binary counter 15. These bits are then converted by means of the decoders 15 and 17 and the LED matrix 11 into a decimal value.

TABLE I

| Counter 13 | rpm | Decimal |
|---|---|---|
| Q1 | 125 | 1 |
| Q2 | 250 | 2 |
| Q3 | 500 | 4 |
| Q4 | 1000 | 8 |
| Q5 | 2000 | 16 |
| Q6 | 4000 | 32 |
| Q7 | 8000 | 64 |

Table II sets out in decimal form the decoded count and the corresponding rpm for a number of the counter values. It also sets out the corresponding LEDs that are lit. As indicated above, there are 32 LEDs. Each LED represents an increment of 250 rpm. In cases where the rpm is at least half way between two LEDs the next LED is flashed. Thus, for 625 rpm, the third lamp, which represents 750 rpm when it is on, is flashed. As will be seen in more detail below the first lamp is connected so as to be always on, 250 rpm thus being the minimum value established for an operating engine.

TABLE II

| Count | rpm | Lamp Turn On Progression | |
|---|---|---|---|
| 1 | 125 | 1 Always on | |
| 2 | 250 | 1 Always on | |
| 3 | 375 | Flash | 2 |
| 4 | 500 | | 2 |
| 5 | 625 | Flash | 3 |
| 6 | 750 | | 3 |
| 7 | 875 | Flash | 4 |
| 8 | 1000 | | 4 |
| 9 | 1125 | Flash | 5 |
| 10 | 1250 | | 5 |
| 11 | 1375 | Flash | 6 |
| 12 | 1500 | | 6 |
| . | | | 6 |
| . | | | |
| . | | | |
| 55 | 6875 | Flash | 28 |
| 56 | 7000 | | 28 |
| 57 | 7125 | Flash | 29 |
| . | | | |
| . | | | |
| . | | | |
| 64 | 8000 | | 32 |

FIG. 2 is a plan view of the tachometer display. As shown, 32 light emitting diodes 40 are arranged in a row. For the moment, assume that the decoders 15 and 17 of FIG. 1 are always enabled. The VCO 19 causes the binary counter to count, and as it does so the lamps would be lit in sequence from the left. Because of the high frequency at which the system operates and the response time of the eye, it would appear that all lamps were constantly on. However, the only time all lights should be lighted is when the speed is 8000 rpm. Assume an 8 cylinder engine operating at 8000 rpm. One will have 4 pulses per engine revolution. This is equivalent to 533⅓ pulses per second which appear at the input of the phase comparator 21. Since the binary counter is dividing by 128, the voltage controlled oscillator must operate at a frequency 128 times this frequency, or 68.266 kHz. This gives a pulse time of 14.65 $\mu$s. The time to reach a count of 64, which is what is required for 8000 rpm will be 64 times that value or 937.5 micro seconds. Thus, if 937.5 or 938 $\mu$s is used as a strobe time during which the decoder is enabled, then at 8000 rpm the counter will be able to reach the count of 64 and light all LEDs within that time. On the other hand if the engine is only operating at 4000 rpm, the pulse rate both at the input and at the VCO will be cut in half. In this case then, after 938 $\mu$s the count will only reach 32 and thus only half of LEDs lights will be lighted. Again, because of the response time of the eye, this will appear as a bar of light extending to 4000 on FIG. 2.

The manner in which the circuitry of FIG. 1 accomplishes this will now be explained in more detail with further reference to the timing diagrams of FIG. 3. Assume the engine is operating at 6375 rpm. The input pulse rate to the phase comparator 21 will be 425 pulses per second, and the output frequency of the VCO will be 54.40 kHz. The time for one VCO pulse will be 18.38 $\mu$s. On the falling edge of the pulse out of the last stage, Q7 of the binary counter, at which point the count will be 0, the one shot multivibrator 25 will be fired. For 8 cylinder operation it is set to output a timing pulse of 938 micro seconds in length. This output is shown on FIG. 3 as TPA. On the next falling edge of a Q1 pulse the output of the one shot 25 is transferred to the D type flip-flop 27. Also at this time the Q2 stage of counter 13 becomes "1" for the first time. Stages Q2-Q7 of counter represent LED counts of 1, 2, 4, 8, 16 and 32, respectively. Thus, the LED count is indicated below the Q1 waveform.

Figure 3:
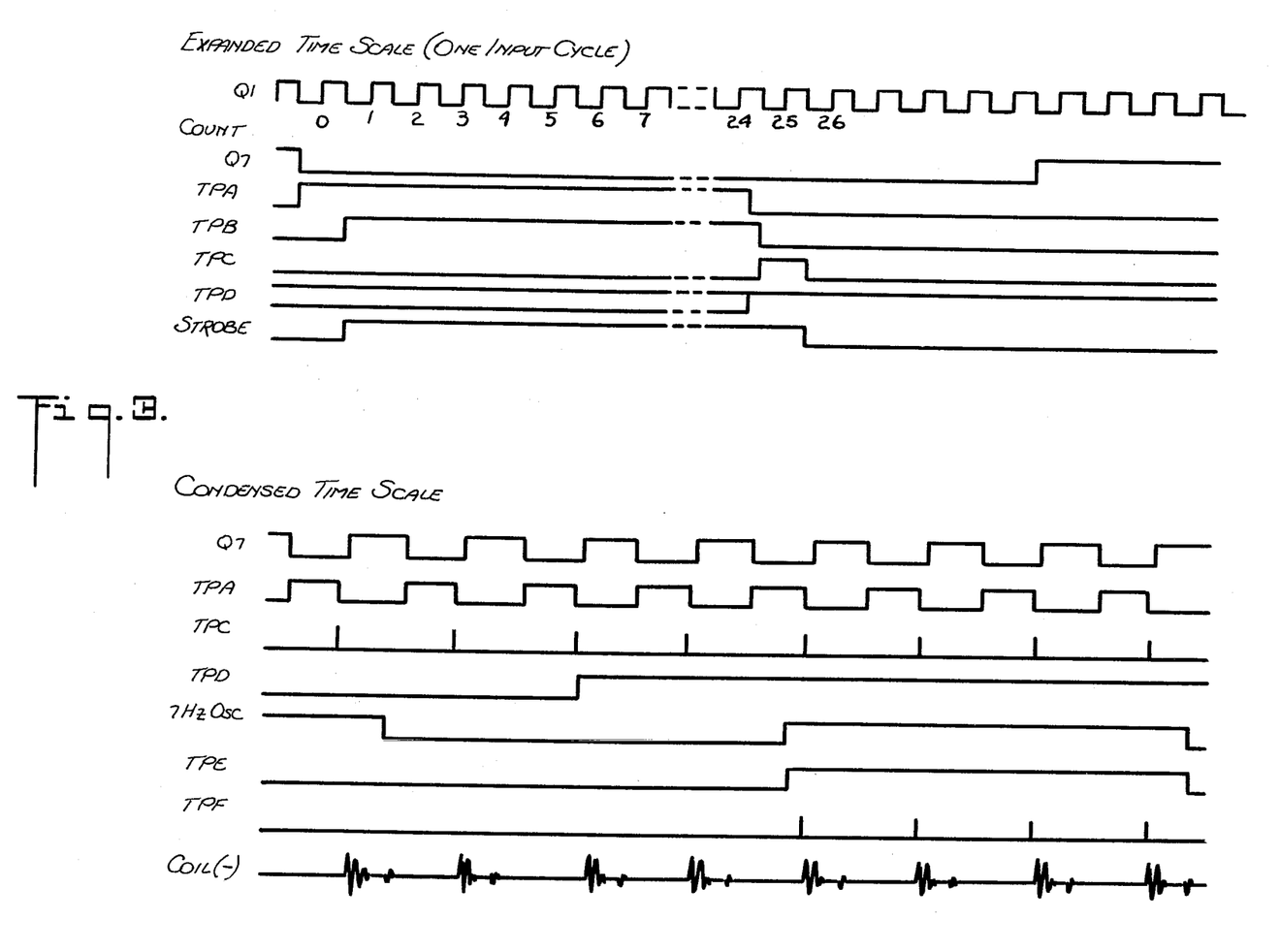
FIG. 3 is a waveform diagram helpful in understanding operation of the tachometer.

The resulting output of flip-flop 27 is indicated as TPB on FIG. 3. This supplies one of the inputs to the OR gate 37, the output of which is labelled "Strobe". This signal enables the decoder 15. Now, as the binary counter counts the pulses from the VCO 19, the lights of FIG. 2 will light in sequence. At the end of 938 micro seconds, TPA goes low presenting a "0" to the D input of flip-flop 27. On the next falling edge of the Q1 output this "0" is transferred to the output and TPB goes low. During the time that TPB was high, there were 25 Q1 output pulses. Thus, 25 lamps would have lighted indicating an rpm of 6250. When the $\bar{Q}$ output of one shot 25 went up at the same time as the signal TPA went down, the 25th pulse was at a high level. As a result, the high level or "1" was transferred to the output of flip-flop 29 and TPD became a "1". Furthermore, when the output of flip-flop 27, i.e., the signal TPB, went low, flip-flop 31 was set providing the output TPC. This enabled AND gate 35. Also shown at the bottom of FIG. 3 is the 7 Hz signal which is also assumed to be high. This enables gate 33 so that the TPD signal will pass therethrough and through AND gate 35, and OR gate 37 to permit the next LED, i.e., the 26th LED to be turned on. With this rpm, each time the 7 Hz signal is present the next LED, i.e., the 26th LED will be turned on. However, because of the 7 Hz signal it will appear to flash.

This is shown better on the condensed time scale of FIG. 3. Shown on this figure is the Q7 and TPA outputs along with the TPC outputs which come at the end of a TPA signal. Also shown is a 7 Hz oscillator signal and the TPD signal. Finally, the output TPF to the OR gate 37 is also shown. As illustrated, because of the 7 Hz signal, the 26th LED will be on four times in a row, and then off four times in a row. This will cause it to appear to flash on and off at the 7 Hz frequency. As noted above, the time between the individual pulses is short enough that within that time it will appear to be on.

Flip-flop 31 is always set for one full cycle of Q1 after the signal TPB goes low. The effect of this is to permit the LED of FIG. 2, corresponding to the next count, i.e., 26 on FIG. 2 to be flashed. Since the enabling signal is present for only one full cycle after the end of the signal TPB, only the next light in the sequence will be able to be flashed. Flip-flop 29 determines whether or not flashing is to occur. The signal TPD must be present at a "1" level along with the 7 Hz flashing signal if an output from AND gate 35 is to be provided. The output of flip-flop 29 will depend on the state of Q1 when the $\bar{Q}$ output of one shot 25 goes high. In the example shown on FIG. 3, at the time the $\bar{Q}$ output of one shot 25 goes low and thus when the Q output goes high, i.e., at the time when TPA goes low, the Q1 signal is high. Thus, this high or "1" level is transferred to the output TPD. However, if the signal TPA went low at a time when the Q1 output was low, TPD would be at "0" and gate 33 would not be enabled to pass the 7 Hz pulse. Under these circumstances no flashing would take place. Since each full cycle of the Q1 output represents an increment of 250 rpm, half a cycle represents 125 rpm. Thus, if the cycle has been completed and the pulse is at "0", indicating that the next stage, i.e., the Q2 state, of the binary counter has just been advanced one, or incremented another 250 rpm, then the last value displayed is the closest. However, if the Q1 output has proceeded more than half way and is again high, this indicates that rpm is at least 125 above the last LED displayed. Thus, in these circumstances, flashing should take place. And, as just explained, it will since the "1" at the Q1 output will be transferred to the output of D type flip-flop 29 to enable gate 33. Then, on the next output of Q2 which occurs when Q1 goes low, because of the further enabling signal from flip-flop 31, the strobe will be provided to decoder 15 to permit flashing by the 7 Hz signal.

Figures 4, 5:
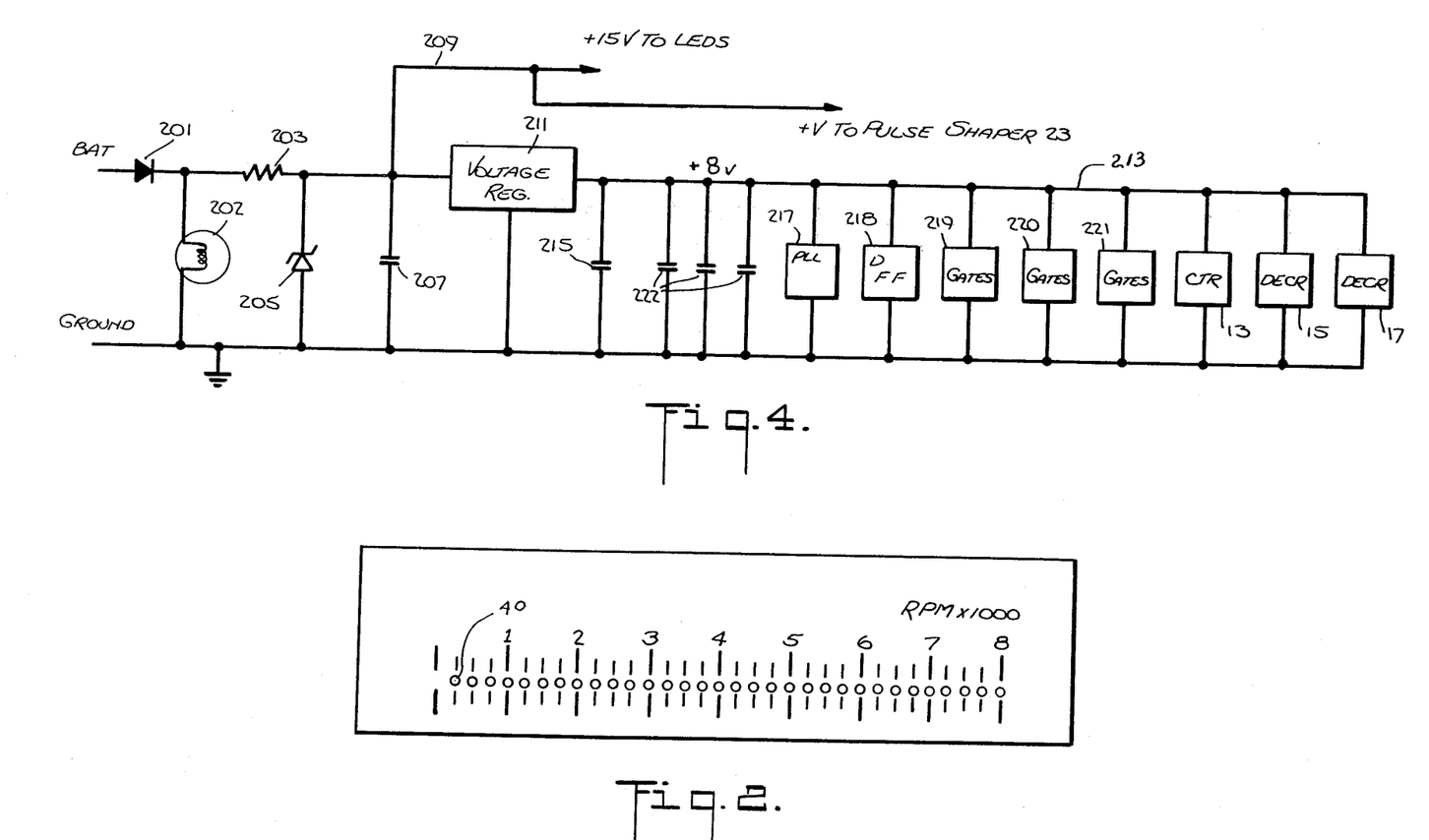
FIG. 4 is a diagram of the power distribution circuits of the tachometer.
FIG. 5 is a logic/circuit diagram of the tachometer.

The power distribution is shown in FIG. 4, along with more details of some of the logic circuits. A protection circuit which includes a series diode 201 and resistor 203 in series with a Zener diode 205 is shown. This is a 15 volt 5 watt Zener regulator. A capacitor 207 is placed in parallel across the Zener. Thus, on the line 209 a maximum of 15 volts will appear. This is the input to a 100 milliamp voltage regulator 211 which provides, at its output on line 213, 8 volts for the logic. A capacitor 215 is placed across the output for noise suppression. As shown, the 8 volts is supplied to the various electronic modules. Module 217 is a phase locked loop, 218 a module containing the two D type flip-flops, 219 a module containing Schmitt trigger NAND gates, 220 and 221 modules containing NAND gates, module 13 the counter, and modules 15 and 17 the decoders. Across this section of the circuit there are also provided capacitors 222. The 15 volt voltage is also supplied to the input circuit, i.e., the pulse shaper circuit 20.

The input circuit, as shown on FIG. 5, includes an input resistor 223 which is supplied to a junction of two diodes in series between the 15 volts and ground in a reverse direction. The first stage of filtering comprises an RC integrator made up of a capacitor 227 and resistor 229. Resistor 229 provides the base input to a PNP transistor 231 which has its emitter connected to the 15 volt supply and its collector grounded through a resistor 233. In parallel with resistor 233 is a capacitor 234 to increase immunity to noise. The signal at the collector of this transistor has too slow a rise time for reliable logic triggering. In view of this, an additional shaping stage follows. This shaping stage comprises a Schmitt trigger constructed of two NAND gates 235 and 237. The signal from the collector of the transistor 231 is fed through a resistor 239 to both inputs of the gate 235, this gate thereby acting as an inverter. The output of gate 235 is connected to both inputs of the gate 237. The output of gate 235 is also the Schmitt trigger inverted output. The output of gate 237 is fed back through a parallel circuit comprising a resistor 241 and capacitor 243. This makes the output of the circuit compatible with CMOS logic levels and switching speeds. The phase locked loop is a module 217 which contains the phase comparator 21 and the voltage controlled oscillator (VCO) 19. The output signal from gate 235 is one input to the phase comparator 21. The capacitor 247 is provided from this input to ground. The second input to the phase comparator is the Q7 output of the counter 13 of FIG. 1. The output of phase comparator 21 is coupled through an external low pass filter comprising resistors 249 and 250 along with capacitor 251. The resistor 253 couples an appropriate input of the VCO 19 to ground and a feedback capacitor 255 is coupled across appropriate terminals of the VCO 19. These components are used to establish a center frequency of about 60 kHz. VCO 19 provides the clock output to the binary counter 13 on line 257.

The strobe logic is also shown on FIG. 5. The one shot multivibrator 25 is implemented using two NAND gates 301 and 303. At this point it might be well to describe the nature of a NAND gate. A NAND gate will have a "0" output only when both its inputs are "1", i.e., only when the condition $\overline{A \cdot B}$ is satisfied. At all other times its output is a "1". Also, a NAND gate is equivalent to an OR gate with inverted inputs. Note that an OR gate has a "0" output only when both its inputs are "0". If both inputs are inverted, then only when both inputs are "1" will it have a "0" output. Thus, it has the same truth tables as a NAND gate. Below, the NAND gates are shown as such or as OR gates with inverted inputs depending on whether they perform an ANDing or ORing function.

Returning to FIG. 5, the input from Q7 is fed to the first NAND gate 301. The output of this NAND gate is coupled through one of three possible capacitor combinations obtained from capacitors 300, 305 and 307 in conjunction with a slide switch 308. In the leftmost position of the slide switch capacitors 300 and 305 will be in parallel. In the middle position only capacitor 305 will be in the circuit, and in the right hand position capacitors 305 and 307 will be in parallel. These capacitors form an RC circuit with resistor 309 and a trim pot 310 which is used to accurately establish the strobe period. As noted above, for 8 cylinders this period is 938 μs, for 6 cylinders 1250 μs and for 4 cylinders 1875 μs. The output at the junction between the switch output and the resistor 309 is one input to the NAND gate 303 which has its other input coupled to the 8 volt supply. The input of gate 303 which is coupled to resistor 309 is also coupled to the cathode of diode 304 having its anode at the junction of a resistor 302 and diode 306 between the positive supply and ground. These components temperature compensate the monostable time period by cancelling the error voltage across diode 304 with a similar voltage across diode 306. Without this, the capacitors 300, 305 and 307 discharge through the substrate diode of gate 303 which exhibits a sizeable change in forward voltage with temperature. The output of gate 303 is fed back as the second input to gate 301. This output is also the clock input to D type flip-flop 29 and the data input to D type flip-flop 27.

While the output of Q7 is at a logical "1", i.e., before the end of the cycle, and the start of a new cycle, gate 301 will have this and a second "1" from the output of gate 303 as inputs. The output of gate 301 will be a logical "0". The input to gate 303 from the RC circuit will be "0". This with its other input, which is a "1", will cause the gate to maintain its "1" output state. However, when Q7 goes low, the output of gate 301 becomes high. The second input to gate 303 immediately goes high and the output of gate 303 goes low to a logical "0". It will remain at a logical "0" for a time period determined by the RC time constant of the resistor capacitor combination then in use, i.e., until the voltage at the junction of the resistor and capacitor at the input to the gate 303 drops below its threshold level, at which time it will return to the logical "1" stage. This output corresponds to what is shown as $\overline{Q}$ from monostable 25 on FIG. 1. Note that at the end of the timing cycle or strobe cycle, when the output at gate 303 rises from "0" to a high level it will cause the state at the data input of flip-flop 29 to be transferred to its output. Also note, that the nature of the D type flip-flops 27 and 29 is that they are triggered with a rising edge.

In accordance with FIG. 1, it is desired to trigger on the falling edge of Q1. For this reason, the signal from Q1 is coupled through a NAND gate 311, having its two inputs coupled together, to the trigger input of the D type flip-flop 27. Thus, the falling edge of Q1 will be converted into a rising edge to trigger flip-flop 27. As explained above in connection with FIG. 1, it is the output of flip-flop 27 which provides the strobe input to OR gate 37. It was indicated that the strobe pulse was a positive pulse in connection with FIG. 1. However, in actuality it is necessary for a logical "0" to be supplied to enable the decoder. In effect, an OR gate 313 having inverted inputs followed by a NAND gate 315 coupled as an inverter are used as the OR gate 37. Flip-flop 27 when it is triggered by the inverted Q1 falling edge will have at its D input, after Q7 has gone low, a "0". In connection with FIG. 1, it was assumed that a "1" was provided. However, since gate 313 has an inverted input this "0" which appears at the Q output of flip-flop 27 will be seen as a "1". It will then be inverted again to a "0" by the inverter 315 to provide the logical "0" strobe pulse which is required. Thus, although implemented with different types of components this circuit provides the equivalent function to FIG. 1.

Flip-flop 31 is implemented with cross coupled NAND gates 317 and 319. Each of the NAND gates have one input coupled to the output of the other gate. The second input of gate 317 is coupled through a resistor 321 to the 8 volt supply and the second input of gate 319 through a resistor 323 to the 8 volt supply. The Q1 output is coupled through a capacitor 325 preceding the resistor into gate 317. This acts as a differentiator so that only the edge of the pulse is seen at the gate. Similarly, the $\overline{Q}$ output of flip-flop 27 is coupled through a capacitor 327 to the second input of gate 319. Assume that the flip-flop 31 is reset and the output of gate 319 is "0". This output is fed back to one input of gate 317 which has a "1" at its other input because of the voltage coupled through resistor 321. Because of this combination it will have a "1" output. This "1" output along with the "1" provided through the resistor 323 at gate 319 will maintain its output at "0". At the end of the timing cycle of the one shot 25, its output goes back to a logical "1". On the next falling edge of Q1 this "1" is transferred to the output of flip-flop 27. This means that a "0" then appears at the $\overline{Q}$ output of flip-flop 27. This "0" which is coupled through the capacitor 327 causes gate 319 to have a momentary "0" and a "1" input, causing its output to go to "1". This "1" output when coupled back to gate 317 causes its output to become "0" to maintain the output of gate 319 at "1". The flip-flop is now set. The output of gate 319 is one input to another NAND gate 329. Gate 329 receives its second input from an a NAND gate 331. One input to OR gate 331 is the output of flip-flop 29. The second input to gate 331 is from the 7 Hz oscillator 34. This oscillator is implemented utilizing a Schmitt trigger type NAND gate with an RC circuit feedback. As illustrated, the NAND gate 333 has one input tied to the 8 volt supply. Its other input is coupled to its input through a resistor 335 with this output also coupled to ground through a capacitor 337. Assume that the voltage on the capacitor is positive. Gate 333 will have two "1"s at its input and its output will be "0". The capacitor will start discharging through the resistor 335. When it discharges below the threshold of gate 333, gate 333 will change its output to a "1". The process will now reverse itself and capacitor 337 will begin charging until it again reaches a value at which the output of the gate will become "0". In this manner, since the gate has hysteresis, i.e., its turn on and turn off thresholds are different, an oscillation will occur with the period of oscillation determined by the selection of resistor 335 and capacitor 337.

As explained above, flashing of the next lamp is required if at the end of the time period of one shot 25 Q1 is a logical "1". Q1 is provided as the data input to flip-flop 29. Thus, if it happens to be a 1, the condition under which blinking is desired, on the rising edge of the output of gate 303 this "1" will be transferred to the Q output of flip-flop 29. When the output of the 7 Hz oscillator is also a "1", there will be a "1" output from gate 330. This "1", presuming that the flip-flop 31 is set and also has a "1" output will result in a "0" output from gate 329 which will be seen by gate 313 as a "1" output and will give the necessary strobe. If, on the other hand, at the time when the output of gate 303 goes high, Q1 is low, the Q output of flip-flop 29 will be at a "0" and the output of gate 330 will be held at "0" preventing an output from gate 329. Thus, the specific circuit shown on FIG. 7 performs the same function as the circuit of FIG. 1, utilizing readily available components.

Gates 303, 317, 319 and 333 are of the Schmitt trigger type contained in module 219.

Figure 6:
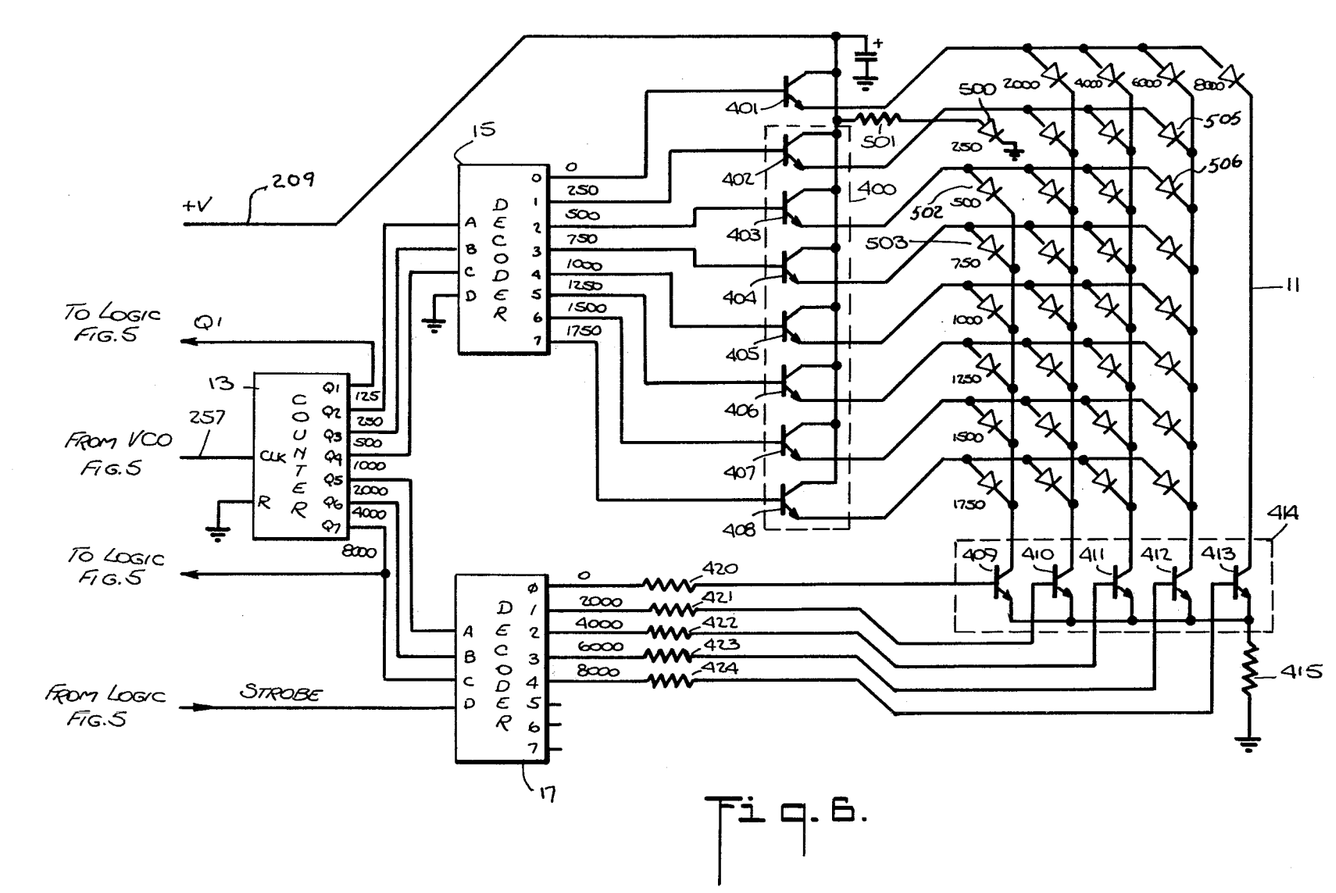
FIG. 6 is a circuit diagram of the display and associated logic.
Figure 9:
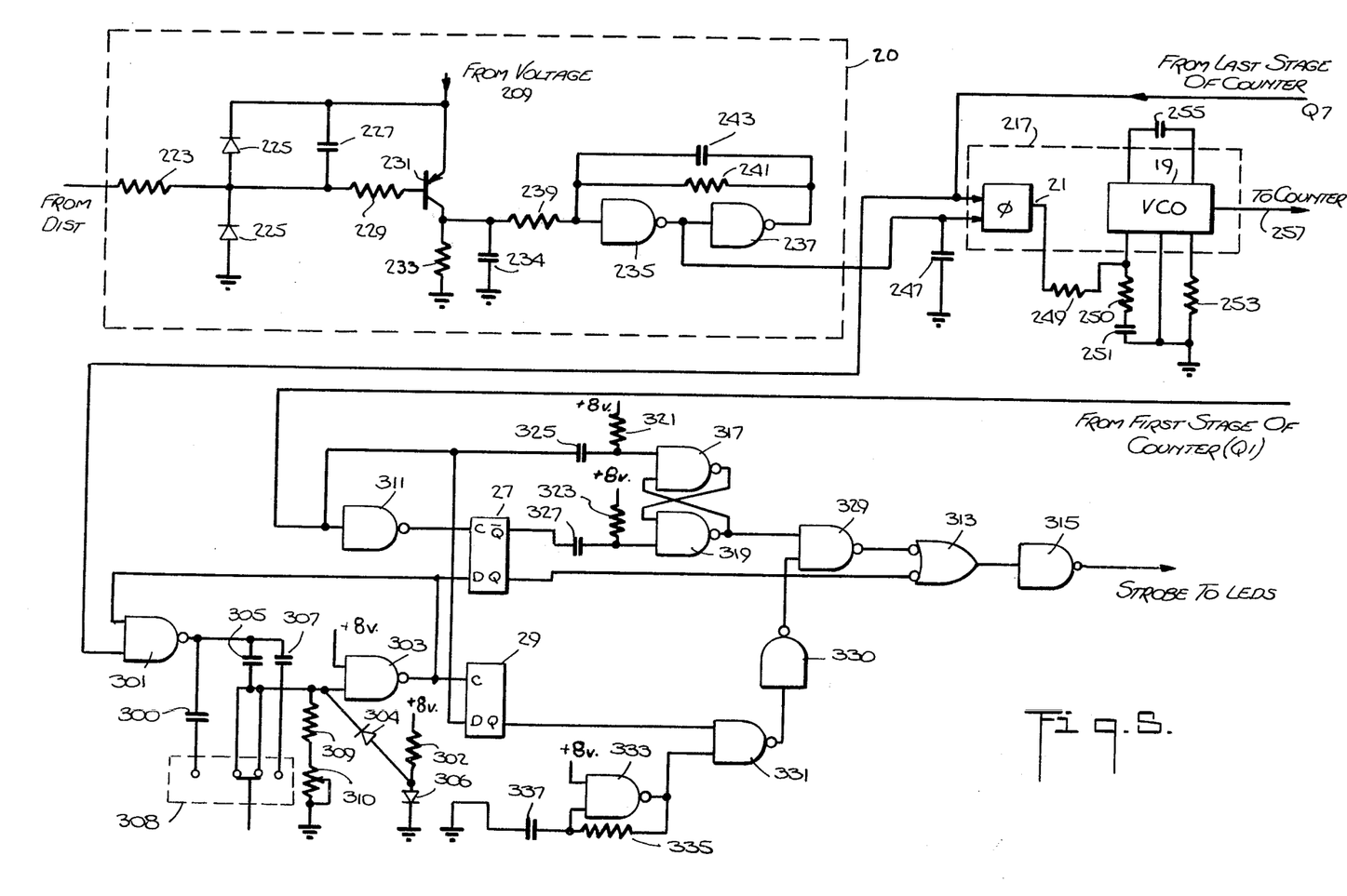

FIG. 6 shows the display 11 in more detail, along with the counter and decoders driving the display. As indicated above, the counter has seven stages Q1 through Q7. As indicated on the Figure, Q1 represents 125 rpm, Q2 250 rpm, etc. The 125 rpm, Q1 signal is used in the manner described above. The Q2, 3 and 4 signals are fed to the A, B, and C inputs of decoder 15. The D input thereof is an enabling input which must be grounded to be enabled. It is permanently connected to ground. The decoder 15 decodes these three binary signals into 8 decimal output signals having the values indicated at the outputs 0 to 7. Similarly, the last three stages of counter 13 are provided as the A, B, and C inputs to decoder 17 which has the strobe as its D input. The 0 to 7 outputs of the decoder 15 are fed to the bases of transistors 401-408 respectively. Similarly, the 0-4 outputs of the decoder 17 are fed through resistors 420-424 to the bases of transistors 409-413 respectively. Resistors 420-424 prevent overloading of transistors 409-413. The collectors of the transistors 401-408 are connected to the +15 volts supply. The emitters of the transistors 409-413 are coupled through a resistor 415 to ground. The transistors 401-408 act as current sources for the individual LEDs while the transistors 409-413 act as current sinks. The individual LEDs are arranged in a matrix such that the anode of each is connected to the emitter lead of one of the transistors 401-408 and its cathode to one of the transistors 409-413. Only one of the transistors 401-408 and one transistor out of the group 409-413 is on at one time. This means that only one LED is selected at one time. Going back to the example discussed above, at the time when the counter is reset to 0, i.e., when output Q7 goes to "0" all inputs to decoder 15 will be "0", as will all inputs to decoder 17. This means that transistor 409 will be turned on as will transistor 401. However, there is no connection for this combination. When the stage Q2 advances to a logical "1", the 1 output will appear from decoder 15. This will turn on transistor 402. Transistor 409 remains on. Again, this has no effect. LED 500 which represents 250 rpm is always connected through a resistor 501 to the positive voltage with its cathode grounded. Thus, it will always be on when power is present. When the count in the counter 13 reaches a decimal 4 the output Q3 will be present. Decoder 15 will decode this and provide an output on line 2. This will turn on transistor 403. Now there is a path established through transistor 403 and through the 500 rpm diode 502, through transistor 409 and resistor 415 to ground. On the next count, i.e., 5, in the counter 13, no change will occur since this represents a 125 rpm step. However, when the count reaches 6, decoder 15 will decode this and provide the output on line 3, turning on transistor 404 and turning off transistor 403. Now the current will be coupled through light emitting diode 503. The diodes will continue to light in sequence for as long as the strobe is present. When the count in counter 13 reaches 16, the Q5 output will appear and be decoded in decoder 17 to turn off transistor 409 and turn on transistor 410; then the second row in the matrix will be lighted in sequence. For the example given above, i.e., where the rpm was 6375, the last diode to be lighted will be diode 505 representing 6250 rpm. At that point the strobe signal will disappear. However, because there is an extra 125 rpm it will appear again almost immediately, again turning on transistor 412 so that diode 506 will be lighted. However, the strobe will not appear every cycle because of the 7 Hz signals. It will appear for a number of cycles which to the eye will cause it to appear to be on constantly for a period of time whereafter it will be off for a period of time and then on again. To the observer it will seem to blink at a rate of 7 Hz. Thus, the person using the tachometer and seeing that the bar of light goes out to 6250 with the next light blinking will know that the actual rpm is 6375.

What is claimed is:

1. A digital tachometer comprising:
   (a) a row of a plurality of closely adjacent light emitting diodes each representing, in order, an equal increment of speed;
   (b) means to sense the rotational speed of rotating apparatus and develop a first signal representative thereof;
   (c) means to convert said first signal into a plurality of signals of a maximum number equal to the number of said plurality of diodes, each associated with a diode and thus a speed increment such that a signal is present for each diode representing a speed equal to, or less than the sensed rotational speed;
   (d) means coupling said plurality of signals to their associated diodes; and
   (e) means to cause the next adjacent diode to the last one for which a signal is generated to blink when the sensed speed exceeds the value associated with said last one by at least one half the increment between diodes.

2. The tachometer according to claim 1 wherein said means to sense comprise means to develop a predetermined number of pulses for each revolution of the rotating apparatus, said first signal being the pulse train so developed.

3. The tachometer according to claim 2 for use with an internal combustion engine wherein said means to develop comprise means to sense the firing pulses of the engine.

4. A digital tachometer for an internal combustion engine comprising:
   (a) means for coupling to the engine to sense the firing of each cylinder thereof and develop a pulse in response thereto, thereby developing a pulse train;

(b) means to multiply said pulse train to provide a second pulse train at a higher frequency in which, between each two sensed pulses, a plurality of pulses are developed;
(c) a binary counter having said second pulse train as an input;
(d) means to decode the output of said counter;
(e) a row of closely adjacent light emitting diodes each representing, in order, an increment of speed having the outputs of said decoder as inputs; and
(f) means for developing an enabling signal of fixed duration equal to the time between pulses on said first pulse train at a speed equal to that represented by the last diode in said row, said enabling signal coupled to enable said light emitting diodes.

5. Apparatus according to claim 4, wherein said means for developing a pulse train comprises a pulse shaper having an input lead adapted for coupling to the coil of an internal combustion engine and providing at its output a pulse train of shaped pulses.

6. Apparatus according to claim 4, wherein said means to multiply said pulse train comprise a phase locked loop including a phase comparator having as a first input the output of said means developing a pulse train and providing an error output; filter means having said phase comparator output as an input; and a voltage controlled oscillator having its input coupled to the output of said filter means and providing at its output a pulse train, the binary counter having as its count input the output of said of said voltage controlled oscillator and providing one of its outputs as a second input to said phase comparator, whereby said phase comparator will cause said voltage controlled oscillator to operate at a frequency which is a multiple of the frequency of said first pulse train.

7. Apparatus according to claim 4, wherein said means for developing an enabling signal comprises a one shot multivibrator having an output pulse length equal to said fixed duration.

8. Apparatus according to claim 7, and further including means to synchronize said enabling signal with the count in the first stage of said binary counter.

9. Apparatus according to claim 8, wherein said means to synchronize comprise a D type flip-flop having a clock input and a data input and at least one output and wherein the output of said one shot multivibrator is coupled to the data input of said flip-flop and the output of the first stage of said binary counter to the clock input thereof, whereby, when said one shot multivibrator changes state, that change will not be reflected at the output of said D type flip-flop until the change at the output of the first stage of said counter, the output of said D type flip-flop being coupled as an enabling input to said light emitting diodes.

10. Apparatus according to claim 9, and further including means to cause the next most significant light emitting diode to flash when the sensed speed reaches a value at least halfway between the last diode lighted and the next most significant diode.

11. Apparatus according to claim 10, wherein said means to cause comprise said binary counter having a first stage representing a speed increment one half the increment represented by said diodes and further including a second D type flip-flop having a data input and a clock input, the data input of said second D type flip-flop coupled to the first output of said binary counter and the clock input of said D type flip-flop coupled to an output of said one shot multivibrator, said clock input adapted to transfer the data present at the data input of said second D type flip-flop to its output at the time when the enabling signal of fixed duration from said multivibrator ends; means to generate a signal at a frequency lower than the response time of the eye; first ANDing means having as inputs the output of said second D type flip-flop and said means to generate a signal; a set reset flip-flop having as a set input, the output of said first D type flip-flop and responsive to the change which occurs when said first D type flip-flop is reset and as a reset input the output of said first stage of said counter; second ANDing means having as inputs the output of said first ANDing means and the output of said set reset flip-flop; ORing means having as inputs the output of said second ANDing means and the output of said first D type flip-flop, the output of said ORing means being provided as an enabling signal to said light emitting diode array whereby, upon the end of said time of fixed duration when said first D type flip-flop is reset, said set reset flip-flop will be set enabling said second ANDing means whereupon, if an output is present from the first stage of said binary counter it will have been transferred to the output of said second D type flip-flop and be coupled through said first ANDing means at a 7 Hz rate, and thus through said enabled second ANDing means and said ORing means to enable said light emitting diodes at a frequency to which the eye can respond.

12. Apparatus according to claim 11, wherein said means for decoding comprise at least first and second decoders at least one of said decoders having an enabling input, wherein the output of the first M stages of said counter are inputs to said first decoder and the remaining stages inputs to said second decoder, one of said decoders being constantly enabled and the other of said decoders having its enabling input coupled to receive said enabling signal, the light emitting diodes arranged in a matrix such that each diode has one terminal coupled to an output of said first decoder and another terminal coupled to an output of said second decoder.

13. Apparatus according to claim 12 and further including a driving transistor interposed between each of said decoder outputs and said diode terminals.

14. Apparatus according to claim 11 wherein said counter has seven stages, the second through seventh stages being used as outputs for said decoders, and wherein said first decoder receives as inputs the second through fourth outputs of said counter and the second decoder the fifth through seventh outputs of said counter.

15. Apparatus according to claim 11 wherein the increment represented by each diode is 250 rpm and the most significant diode represents 8,000 rpm, whereby said first decoder will provide outputs and increments from 0 to 1750, and said second decoder increments of 0, 2,000, 4,000, 6,000 and 8,000 rpm.

16. Apparatus for providing an output representative of the frequency of a pulse train comprising:
(a) a row of a plurality of closely adjacent light emitting diodes, each representing, in order, an equal increment of frequency;
(b) means to convert said pulse train into a plurality of signals of a maximum number equal to the number of said plurality of diodes, each associated with a diode, and thus a frequency increment, such that a signal occurs for each diode representing a frequency equal to or less than the frequency being measured;

(c) means coupling said plurality of signals to their associated diodes; and (d) means to cause the next adjacent diode to the last one for which a signal is generated to blink when the sensed frequency exceeds the value associated with said last one by at least one half the increment between diodes.

17. Apparatus for measuring the frequency of a pulse train comprising:

(a) binary counter having said pulse train as an input;
(b) means to decode the output of said counter into a sequence of individual outputs of each present for an equal time;
(c) a row of closely adjacent light emitting diodes each representing, in order, an increment of frequency having the outputs of said decoder as inputs;
(d) means for developing an enabling signal of fixed duration equal to the total time for said counter to count a number of pulses on said pulse train, at a frequency equal to that represented by the last diode in said row corresponding to the maximum frequency, said enabling signal coupled to enable said light emitting diodes; and
(e) means to multiply said pulse train to provide a second pulse train at a higher frequency in which, between each two sensed pulses, a plurality of pulses are developed, said second pulse train being fed to said binary counter whereby a pulse train at a frequency which would result in a flicker of said light emitting diodes which could be detected by the eye will be multiplied to a frequency which will not be detectable to the eye.

18. Apparatus according to claim 17, wherein said means to multiply said pulse train comprise a phase locked loop including a phase comparator having as a first input the output of said means developing a pulse train and providing an error output; filter means having said phase comparator output as an input; and a voltage controlled oscillator having its input coupled to the output of said filter means and providing at its output a pulse train, the binary counter having as its count input the output of said of said voltage controlled oscillator and providing one of its outputs as a second input to said phase comparator, whereby said phase comparator will cause said voltage controlled oscillator to operate at a frequency which is a multiple of the frequency of said first pulse train.

19. Apparatus for measuring the frequency of a pulse train comprising:

(a) binary counter having said pulse train as an input;
(b) means to decode the output of said counter into a sequence of individual outputs each present for an equal time;
(c) a row of closely adjacent light emitting diodes each representing, in order, an increment of frequency having the outputs of said decoder as inputs;
(d) a one shot multivibrator having an output pulse length of fixed duration equal to the total time for said counter to count a number of pulses on said pulse train, at a frequency equal to that represented by the last diode in said row corresponding to the maximum frequency, said enabling signal coupled to enable said light emitting diodes;
(e) a D type flip-flop having a clock input and data input and at least one output, the output of said one shot multivibrator coupled to the data input of said flip-flop and the output of the first stage of said binary counter to the clock input thereof, whereby, when said one shot multivibrator changes state, that change will not be reflected at the output of said D type flop-flip until the change at the output of the first stage of said counter, the output of said D type flip-flop being coupled as an enabling input to said light emitting diode array.

20. Apparatus according to claim 19 and wherein said pulse train is at a frequency which would result in a flicker of said light emitting diodes which could be detected by the eye and further including means to multiply said pulse train to provide a second pulse train at a higher frequency in which, between each two sensed pulses, a plurality of pulses are developed, said second pulse train being fed to said binary counter.

21. Apparatus according to claim 19, and further including means to cause the next most significant light emitting diode to flash when the sensed frequency reaches a value at least halfway between the last diode lighted and the next most significant diode.

22. Apparatus according to claim 25 wherein said means to cause comprise said binary counter having a first stage representing a frequency increment one half the increment represented by said diodes and further including a second D type flip-flop having a data input and a clock input, the data input of said second D type flip-flop coupled to the first output of said binary counter and the clock input of said D type flip-flop coupled to an output of said one shot multivibrator, said clock input adapted to transfer the data present at the data input of said second D type flip-flop to its output at the time when the enabling signal of fixed duration from said multivibrator ends; means to generate a signal at a frequency lower than the response time of the eye; first ANDing means having as inputs the output of said second D type flip-flop and said means to generate a signal; a set reset flip-flop having as a set input, the output of said first D type flip-flop and responsive to the change which occurs when said first D type flip-flop is reset and as a reset input the output of said first stage of said counter; second ANDing means having as inputs the output of said first ANDing means and the output of said set reset flip-flop; ORing means having as inputs the output of said second ANDing means and the output of said first D type flip-flop, the output of said ORing means being provided as an enabling signal to said light emitting diode array whereby, upon the end of said time of fixed duration when said first D type flip-flop is reset, said set reset flip-flop will be set enabling said second ANDing means whereupon, if an output is present from the first stage of said binary counter it will have been transferred to the output of said second D type flip-flop and be coupled through said first ANDing means at a 7 Hz rate, and thus through said enabled second ANDing means and said ORing means to enable said light emitting diode array alternately at a frequency to which the eye can respond.

23. Apparatus according to claim 19, and further including a driving transistor interposed between each of said decoder outputs and said diode terminals.

24. Apparatus according to claim 23, wherein said counter has seven stages, the second through seventh stages being used as outputs for said decoders, and wherein said first decoder receives as inputs the second through fourth outputs of said counter and the second decoder the fifth through seventh outputs of said counter.

25. A method of displaying the frequency of a pulse train comprising:
   (a) disposing a plurality of light emitting diodes in closely adjacent relationship, each diode representing a predetermined frequency with successive diodes indicating successive frequency increments;
   (b) converting said pulse train into a plurality of signals of a maximum number equal to the number of said plurality of diodes, each signal associated with a diode and thus with a frequency increment up to a signal representing the sensed frequency;
   (c) coupling said plurality of signals to their associated diodes; and
   (d) causing the next adjacent diode to the last one for which a signal is generated to blink when the sensed frequency exceeds the value associated with said last diode by at least one half the increment between diodes.

26. The method according to claim 25, and further including the step of causing the next adjacent diode to the last one for which a signal is generated to blink when the sensed frequency exceeds the value associated with said last diode by at least one-half the increment between diodes.

27. The method according to claim 25, wherein said step of converting comprises counting the pulses of said pulse train in a binary counter; and decoding the output of said counter so as to provide a pulse of equal fixed duration for each light emitting diode, said pulses occurring in sequence and further including the step of developing an enabling signal of fixed duration equal to the time required to generate a pulse for each diode at a frequency equal to that represented by the last diode in said row and enabling said light emitting diodes with said enabling signal.

28. The method according to claim 25, and further including the step of multiplying the pulse train being sensed and utilizing said multiplied pulse train to develop said signals whereby a pulse train at a higher frequency which will avoid the appearance of flickering in said display can be developed.

29. A method of displaying the frequency of a pulse train comprising:
   (a) multiplying the pulse train to develop a further pulse train at a higher frequency;
   (b) disposing a plurality of light emitting diodes in closely adjacent relationship, each diode representing a predetermined frequency with successive diodes indicating successive frequency increments;
   (c) converting said further pulse train into a plurality of signals of a maximum number equal to the number of said plurality of diodes, each signal associated with a diode and thus with a frequency increment up to a signal representing the sensed frequency; and
   (d) coupling said plurality of signals to their associated diodes whereby, because of said multiplied pulse train, the appearance of flickering will be avoided.

30. The method according to claim 29, wherein said sensed frequency is the frequency of rotating apparatus and further including the step of sensing said speed of rotation to develop said pulse train.

31. The method according to claim 30, wherein said rotating apparatus comprises an internal combustion engine and wherein said step of sensing comprises sensing the firing pulses of said engine.

32. The method according to claim 31, and further including providing thirty diodes, the least significant one representing 250 rpm and the most significant diode representing 8,000 rpm, the increments between the diodes being 250 rpm.

33. A method of displaying the frequency of a pulse train comprising:
   (a) multiplying said pulse train to provide a second pulse train at a higher frequency in which, between each two sensed pulses, a plurality of pulses are developed;
   (b) counting the pulses of said second pulse train in a counter;
   (c) decoding the output of the counter so as to provide a plurality of pulses, of equal duration in sequence for successive incremental counts of the counter;
   (d) disposing a plurality of light emitting diodes in closely adjacent relationship, the number of said diodes being equal to the number of individual pulses decoded;
   (e) coupling said decoded pulses to the associated ones of said light emitting diodes; and
   (f) enabling said light emitting diodes with an enabling signal having a duration which begins with the first count of said counter and extend over a period, during which period said counter would reach the last count thereof if the pulse train was at a predetermined maximum frequency to be measured, whereby a bar graph type display representing the measured frequency will be provided.

34. Apparatus for measuring the frequency of a pulse train comprising:
   (a) binary counter having said pulse train as an input;
   (b) at least first and second decoders, at least one of said decoders having an enabling input, the output of the first M stages of said counter being coupled as inputs to said first decoder and the remaining stages as inputs to said second decoder, one of said decoders being constantly enabled and the other of said decoders having said enabling input, said decoders decoding the output of said counter into a sequence of individual outputs, each present for an equal time;
   (c) a row of closely adjacent light emitting diodes, each representing, in order, an increment of frequency, having the outputs of said decoder as inputs, said light emitting diodes arranged in a matrix such that each diode has one terminal coupled to an output of said first decoder and another terminal coupled to an output of said second decoder; and
   (d) means for developing an enabling signal of fixed duration equal to the total time for said counter to count a number of pulses on said pulse train, at a frequency equal to that represented by the last diode in said row corresponding to the maximum frequency, said enabling signal coupled to the enabling input of said one decoder to thereby enable said light emitting diodes.

* * * * *

UNITED STATES PATENT AND TRADEMARK OFFICE
CERTIFICATE OF CORRECTION

PATENT NO. : 4,243,938

DATED : January 6, 1981

INVENTOR(S) : Andrew W. Bliven, II; Peter J. Kindlmann

It is certified that error appears in the above-identified patent and that said Letters Patent are hereby corrected as shown below:

Col. 4, line 61 change "$\overline{Q}$" to --Q--;

line 63 change "Q" to --$\overline{Q}$--.

Col. 10, line 53 after "from" delete "an".

Col. 16, line 23 after "claim" change "25" to --21--.

Signed and Sealed this

Third Day of August 1982

[SEAL]

Attest:

GERALD J. MOSSINGHOFF

*Attesting Officer*  *Commissioner of Patents and Trademarks*